Patented June 10, 1924.

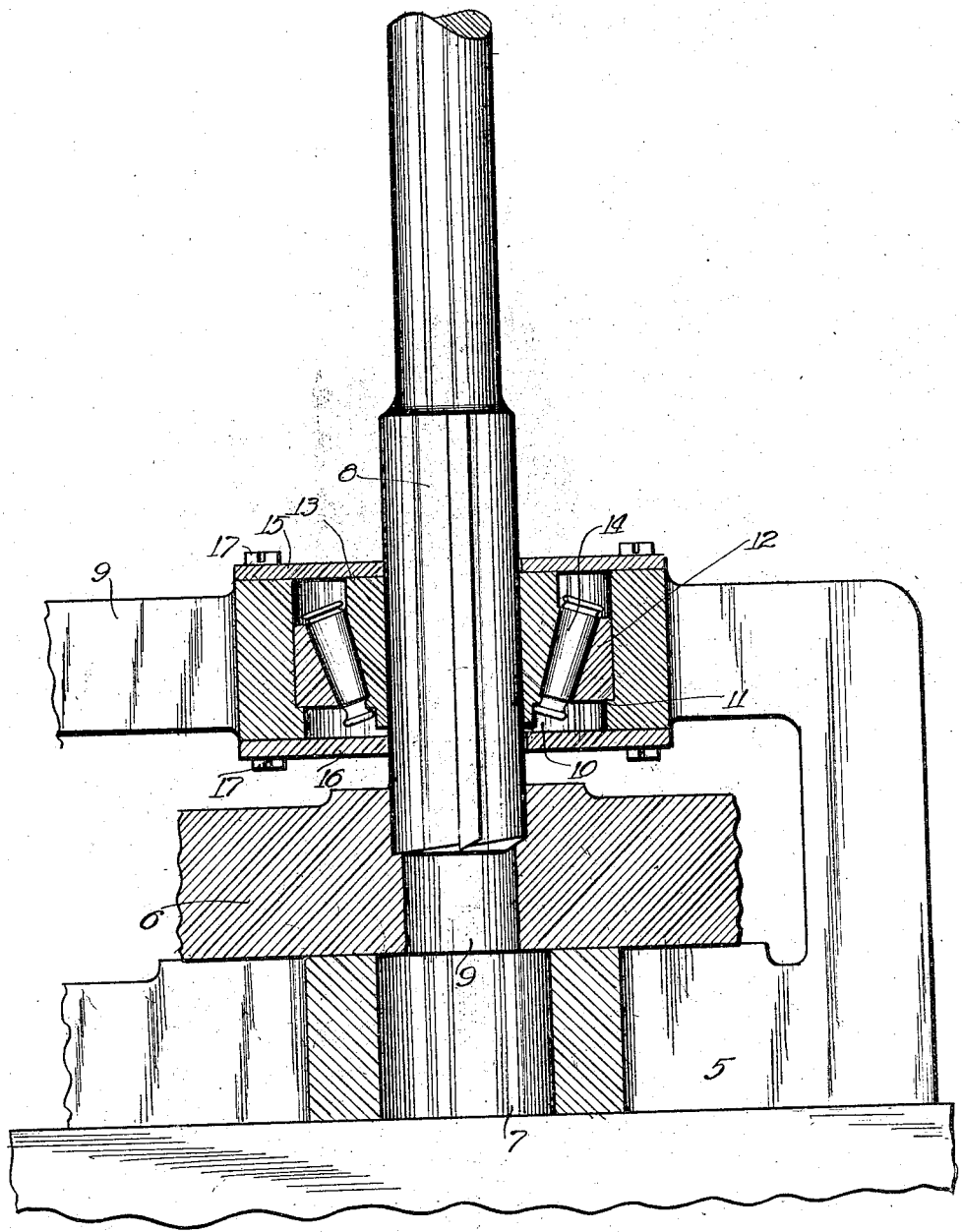

1,496,948

UNITED STATES PATENT OFFICE.

GUY A. SCHUTT, OF KENDALLVILLE, INDIANA.

METAL-WORKING MACHINE.

Application filed November 3, 1920. Serial No. 421,450.

*To all whom it may concern:*

Be it known that I, GUY A. SCHUTT, a citizen of the United States, and resident of Kendallville, in the county of Noble and State of Indiana, have invented a certain new and useful Improvement in Metal-Working Machines, of which the following is a full, clear, concise, and exact description, reference being had to the accompanying drawing, forming a part of this specification.

My invention relates to improvements in metal working machines and is particularly concerned with improvements in that type of metal working machines which employ rotary cutters, such, for instance, as drills, reamers, bearing bores, etc.

In quantity production of parts requiring the formation of holes or openings therein or therethrough, it is customary to use jigs for guiding and centering the boring or cutting tools. These jigs comprise plates or other supporting and guiding means having openings formed therein for receiving and guiding the cutting tool prior to its engagement with the work so as to prevent the cutting tool from being displaced laterally from the predetermined center on which it is to operate.

Because of the fact that the cutting edges of tools such as drills, reamers, etc., snugly engage the sides of the openings in the jigs through which they pass and have a tendency under the lateral strains imposed upon the tools to cut away the sides of the openings, it has heretofore been the practice to insert bushings of case-hardened steel in the openings in the jigs, the bushings have an internal bore sufficiently large to permit the passage of the tool without any lateral movement. It has been found, however, that even these case-hardened bushings are more or less rapidly cut away and have to be replaced with new ones.

The objects of my invention are—

First: To provide a metal working machine comprising means for guiding a cutting tool of such character that there is little or no relative movement between the cutting tool and that portion of the guiding means in immediate contact therewith whereby substantially all wear upon the guiding means is eliminated.

Second: To provide a metal working machine having a rotating cutter with guiding means supported by an anti-friction bearing so as to permit the free and easy rotation of the guiding means through which the cutting tool passes.

Third: To provide a new and improved jig in which the guiding bushing is rotatably supported by an anti-friction bearing, and Fourth: To provide a new and improved jig or metal working machine with means for guiding a rotating cutting tool, the said means comprising means for automatically centering the guiding means and compensating for wear therein.

Other objects will appear as this description progresses, reference being had to the accompanying drawing in which I have illustrated my invention in connection with the jig for centering a reamer or other similar rotating cutting tool, the drawing being partially in section.

Referring to the drawing, I have illustrated my improved jig as comprising a lower supporting plate 5 for the work 6, the plate 5 having an opening 7 formed therein for receiving the cutting tool 8 after it passes through the work 6. In the embodiment of my invention illustrated in the drawing, the cutting tool is shown as consisting of a reamer for reaming the hole 9 previously formed in the work 6.

The upper plate 9 of the jig has an opening 10 formed therein which is shouldered at 11 to provide a support for the race 12. A bushing 13 is provided with a central bore, the walls of which embrace the periphery of the cutting tool 8 sufficiently close to prevent any lateral deflection but at the same time permitting the cutting tool to be freely reciprocated in the bushing to bring it into and out of engagement with the work.

Tapered roller bearings 14 are interposed between the bushing 13 and the race 12 so as to provide an anti-friction bearing for the bushing 13 to permit it to rotate freely with the cutting tool 8. As a result of this construction, there is practically no relative movement between the cutting tool 8 and the bushing 13 and consequently no tendency for the bore of the bushing to become enlarged through the cutting action of the tool.

Preferably both ends of the opening 10 are closed by the annular cover plates 15 and 16 which may be secured to the plate or support 9 by means of screws 17 or in any other suitable manner. In this manner, shavings, dust and dirt are excluded from the roller bearings.

It will be noted that the race 12, the outer periphery of the bushing 13 and the roller bearings 14 are so tapered that any pressure exerted upon the bushing 13 either through the frictional contact with the bushing of the cutting tool or in any other manner, tends to automatically center the bushing 13.

If, for any reason, the opening through the bushing 13 should become enlarged to such an extent as to require its renewal, this is easily accomplished by merely removing the cover plate 15 and the bushing and replacing it with a new one. Such renewals are, however, required much less frequently than with the type of bushing now in common use.

While I have described the details of construction of the preferred embodiment of my invention, it is to be clearly understood that my invention is not to be limited to these details of construction but is capable of other adaptations and modifications within the scope of the appended claims.

Having thus described my invention, what I claim as new and desire to secure by Letters Patent of the United States is:—

1. The combination with a machine comprising a rotatable and reciprocable cutting tool having cutting edges on its periphery, of a jig for guiding said tool comprising a sleeve surrounding a portion of said cutting tool and engaging the periphery thereof, a support, and roller bearings interposed between said sleeve and said support, the said sleeve and roller bearing to be tapered to cause said sleeve to be self-centering when said cutting tool is moved toward the work.

2. A jig comprising a support, an opening therethrough, a race supported in said opening, a sleeve for receiving a cutting tool, roller bearings interposed between said sleeve and said race for rotatably supporting said sleeve and means for holding said sleeve in place, the said sleeve and roller bearings being tapered to self-center said sleeve upon movement thereof toward the work.

In witness whereof I hereunto subscribe my name this 23d day of October, 1920.

GUY A. SCHUTT.

Witnesses:
 FRED L. BODENHAFER,
 J. AUSTIN JONES.